United States Patent [19]
Weber et al.

[11] Patent Number: 5,974,949
[45] Date of Patent: Nov. 2, 1999

[54] ESPRESSO MACHINE

[75] Inventors: René Weber, Rothrist; Georges Feierabend, Aarburg, both of Switzerland

[73] Assignee: Eldom Rothrist AG, Rothrist, Switzerland

[21] Appl. No.: 09/024,746

[22] Filed: Feb. 18, 1998

[30] Foreign Application Priority Data

Feb. 18, 1997 [CH] Switzerland .............................. 0364/97

[51] Int. Cl.$^6$ ...................................................... A47J 31/40
[52] U.S. Cl. ......................... 99/289 R; 99/295; 99/302 R
[58] Field of Search ................................ 99/289 R, 295, 99/302 R, 202 P, 289 T

[56] References Cited

U.S. PATENT DOCUMENTS

| | | |
|---|---|---|
| 3,229,612 | 1/1966 | Brown . |
| 3,370,523 | 2/1968 | Wright . |
| 3,599,557 | 8/1971 | Leal . |
| 5,017,759 | 5/1991 | Baldacci . |
| 5,755,149 | 5/1998 | Blanc et al. ........................... 99/295 X |

FOREIGN PATENT DOCUMENTS

| | | |
|---|---|---|
| 2 745 995 | 9/1997 | France . |
| WO 94/23623 | 10/1994 | WIPO . |
| WO 95/17121 | 6/1995 | WIPO . |

OTHER PUBLICATIONS

European Search Report.

*Primary Examiner*—Reginald L. Alexander
*Attorney, Agent, or Firm*—Finnegan, Henderson, Farabow, Garrett & Dunner, L.L.P.

[57] ABSTRACT

The espresso machine works with filter capsules and has a scalding unit (4) with two scalding chamber parts (2, 3) which can be moved relative to each other between an opening position and a closing position. The scalding chamber parts (2, 3) enclose between them in their opening position a gap (1). The gap (1) provided for throwing in the filter capsules can be closed by a swivel-type upper lever (15) and towards the bottom also by a swivel-type lower lever (18). Preferably the machine is equipped with a drain pipe (14) the angle of which can be adjusted. The adjustability of the drain pipe (14) permits the use of larger cups whereas spilling of espresso past the cup is avoided when smaller cups are used. Preferably the drain pipe is mounted in the base of a drain tub.

30 Claims, 2 Drawing Sheets

ESPRESSO MACHINE

BACKGROUND OF THE INVENTION

1. Filed of the Invention

The invention in hand concerns an espresso machine which works with filter capsules.

2. Description of the Related Art

An espresso machine of this type is known, e.g. from WO 95/17121.

SUMMARY OF THE INVENTION

The advantages and purposes of the invention will be realized and attained by means of the elements and combinations particularly pointed out in the appended claims.

To attain the advantages and in accordance with the purpose of the invention, the espresso machine for use with filter capsules, in a first aspect, includes a hydraulic assembly, a heater element, a scalding unit, and an actuation assembly. The hydraulic cylinder has a movable cylinder and a fixed piston. The heater element is for heating water. The scalding unit is provided between the hydraulic cylinder and the heater element and is for receiving heated water from the heater element. The scalding unit includes two scalding chamber parts movable relative to one another between an opening position and a closing position upon actuation of the hydraulic assembly. The scalding chamber parts define a gap therebetween, the gap having a top and a bottom. The scalding unit further includes an upper lever having a first and a second position for closing and opening, respectively, the top of the gap and a lower lever having a first and a second position for closing and opening, respectively, the bottom of the gap. The actuation assembly is coupled to the scalding unit. Further, the actuation assembly includes an actuation lever for moving the upper lever from its first to its second position and the lower lever from its second to its first position.

In a second aspect, the invention encompasses the espresso machine described above and further including a drain pipe coupled to the fixed piston, the angle of the drain pipe being adjustable relative to the fixed piston.

Advantageous and preferred designs are stated in the attendant claims or become clear from the embodiment explained in the following.

BRIEF DESCRIPTION OF THE DRAWINGS

In the following the embodiment is explained in closer detail in connection with a drawing. It shows.

DETAILED DESCRIPTION OF THE INVENTION

Figure 1:
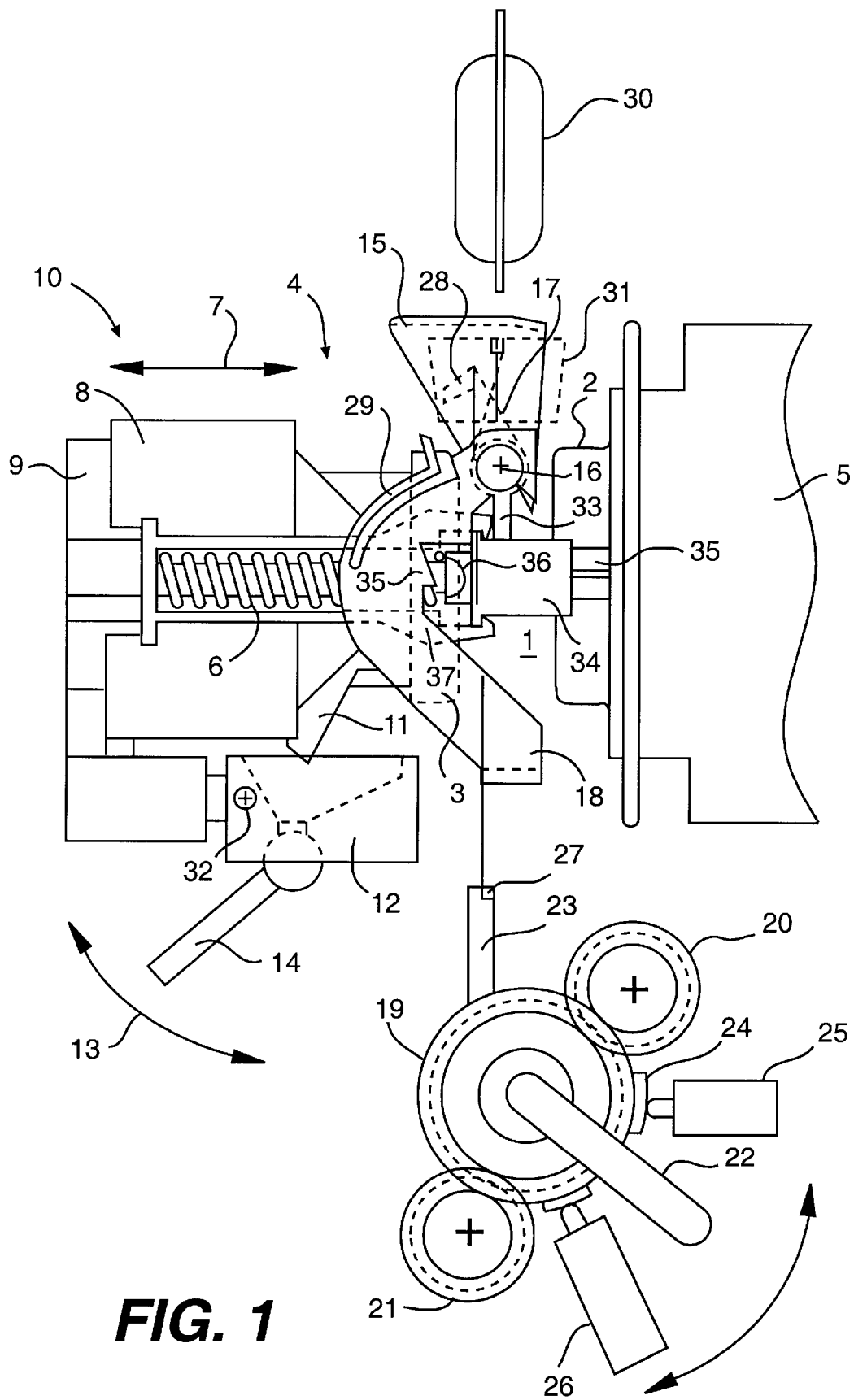
FIG. 1 in partly only a schematic representation the most important elements of the scalding and drain unit of an espresso machine according to the invention with a drain tub with adjustable drain pipe.

1 in FIG. 1 designates a gap between the first scalding chamber part 2 and a second scalding chamber part 3 of a scalding unit 4. The scalding chamber part 2 is rigidly mounted and connected with a heating element 5 for the heating of water. The scalding chamber part 3 is part of a cylinder 8 which is hydraulically adjustable against the action of two springs 6 (only the first being visible in FIG. 1) according to the double arrow 7 and which 8 forms a hydraulic assembly 10 together with a fixed piston 9. A drain opening at the cylinder 8 is arranged above a rigidly mounted drain tub 12. A drain pipe 14 is swivel-mounted in the base of the drain tub 12 according to the double arrow 13.

15 designates an upper lever which closes the gap 1 at the top and which, around two shafts 16 (only the front one is visible in FIG. 1), can be swiveled counter clockwise and against the action of a spring 17 out of the area of the gap 1. A second lower lever 18 closes the gap 1 towards the bottom and can be swiveled likewise, however in clockwise direction, around the shaft 16 out of the area of the gap 1.

Drawn separately at the bottom is an assembly with 3 gears 19, 20 and 21 which are in mesh with each other. The middle gear 19 in provided with an actuation lever 22 and with an actuation arm 23 and additionally has a cam travel 24 which is being traced by two tracer switches 25 and 26.

For making espresso a vessel, e.g. a cup (not shown), is initially placed under the drain pipe 14, wherein the adjustability of the drain pipe has the advantage that even larger cups can be used while simultaneously avoiding that espresso is spilled past the cup when smaller type cups are used. Subsequently the actuation lever 22 can be swiveled counter clockwise. During this and because of this the following sequence of actions ensues:

The upper lever 15 is swiveled out of the area of the gap 1 in a counter clockwise direction by way of the actuation arm 23 on the gear 19 and a cam 27 provided on the actuation arm 23, and which cam 27 comes to rest against a cam 28 molded on the upper lever 15. During this the cam 28 on the upper lever comes in contact with a spring lug 29 on the lower lever resulting in the lower lever 18 being swiveled into its shown swivel position in counter clockwise direction from a swivel position rotated clockwise with respect to that shown. As soon as the lower lever 18 has reached the shown swivel position, the cam 28 on the upper lever snaps over the spring arm 29 so that the upper lever without driving the lower lever can still be swiveled a bit further. In the state finally attained the gap 1 is open at the top while it is closed towards the bottom by the lower lever 18. A filter capsule 30 filled with ground espresso can now be thrown into the gap 1 from the top while it is guided by a throw-in funnel 31. Because of the lower lever 18 it comes to rest exactly between and at the level of both the scalding chamber parts 2 and 3.

By way of the tracer 25 (with a first time delay) a hydraulic pump (not shown) is electrically switched on which generates the hydraulic pressure required for moving the cylinder 8.

The gear 21 is used to actuate a valve (not shown) in a hydraulic line (not shown either) which is pushed onto the nozzle 32 on the drain tub 12. From there the hydraulic pressure is directed through a nipple 38 (FIG. 2) in the mentioned hydraulic assembly where it causes the cylinder 8 to shift to the right, closing the gap 1 and tightly enclosing the filter capsule 30 between the two scalding chamber parts 2 and 3.

Having moved through a first part section of its travel the cylinder 8 comes to a stop against the upper lever which is still being held in its open position by the actuation arm 23. However, cam 27 at the actuation arm 23 and cam 28 on the upper lever 15 are so designed that they are able to slide from one another under the influence of the cylinder 8 pushing against the upper lever 15. Consequently the upper lever 15 is able, under the influence of the spring 17, to swivel back into the gap 1, closing the latter towards the top. This is important to prevent that for instance more filter capsules 30 are thrown in which could lead to malfunction.

While traveling the remaining part section of its travel the cylinder 8 finally comes to rest also against a linkage 33 which holds the throw-in funnel 31 and by means or which the lever shafts 16 are connected with two sockets 34 which can slide along guide rods 35. As a consequence the entire unit consisting of sockets 34, linkage 33, throw-in funnel 31 and the upper lever 15 and the lower lever 18 are driven to the right by the cylinder 8. During this an inclined part 39 on the lower lever 18 comes to rest against a fixed stop 36, causing the lower lever 18, from its shown swivel position, to be swiveled out of the 1 gap in clockwise direction. The gap 1 is subsequently open at the bottom.

By way of the tracer 26 (with a second time delay) the heater element 5 and an additional pressure pump (not shown) are switched on electrically, which pumps the water required for the preparation of the espresso through the heater element 5 into or through the scalding unit 4.

A valve (not shown) in the scalding water supply line (not shown) to the heater element is opened by means of the gear 20.

The espresso produced by the flow through the filter capsule in the scalding unit 4 leaves the cylinder 8 through the drain opening 11, is collected in the drain tub 12 and finally flows through the swivel-mounted drain pipe 14 set in the base into the cup provided.

Once the desired espresso quantity has been prepared, the actuation lever 22 is swiveled back into its original or zero position while the tracers 25 and 26 switch off the electrical components and the gears 20 and 21 again close the valves mentioned.

After the closing of the valves in the hydraulic line and the resulting pressure drop in the hydraulic assembly 10 the cylinder 8 returns into its shown original position under the action of the springs 6, reopening gap 1 so that the used filter capsule falls out of the former. This is possible since it is no longer restricted by the lower lever 18 which has meanwhile been swiveled out of gap 1. As an advantage a simple removable collection container (not shown) for the used-up filter capsules is provided in the espresso machine casing below the gap 1. On returning, the cylinder, by means of hooks 37, finally takes the sockets 34 and thus the entire unit consisting of sockets 34, linkage 33, throw-in funnel 31 and the upper lever 15 and the lower lever 18 along into their original position. Any espresso that might run out of the drain opening 11 of the cylinder 8 during the return travel is collected in the drain tub 12 and still directed into the cup.

Figure 2:
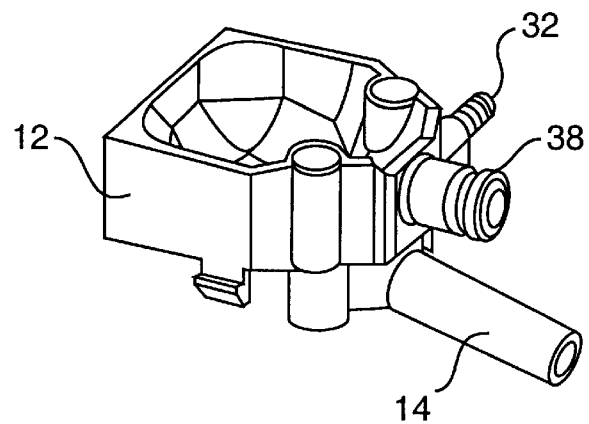
FIG. 2 the drain tub with the drain pipe in perspective representation, mainly from the front.

FIG. 2 shows the drain tub 12 with the drain pipe 14 in perspective representation mainly from the front. The nozzle 32 and the nipple 38 can also be seen.

Figure 3:
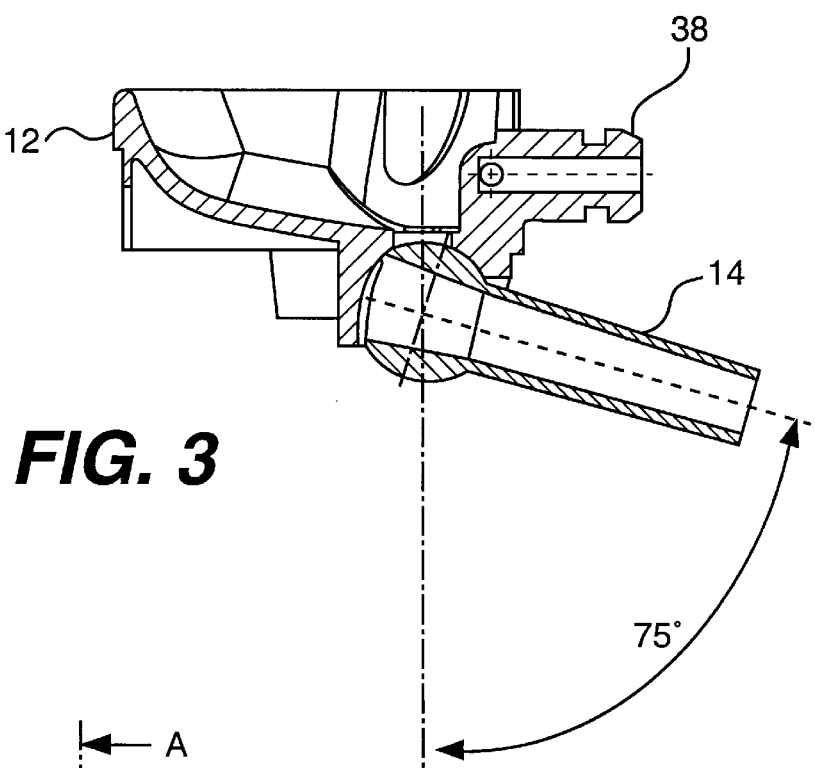
FIG. 3 a section (A—A in FIG. 4) through the drain tub of FIG. 2.

In the section of FIG. 3 it can be seen that the swivel mounting of the drain pipe 14 in the base of the drain tub 12 is designed as a ball joint.

Figure 4:
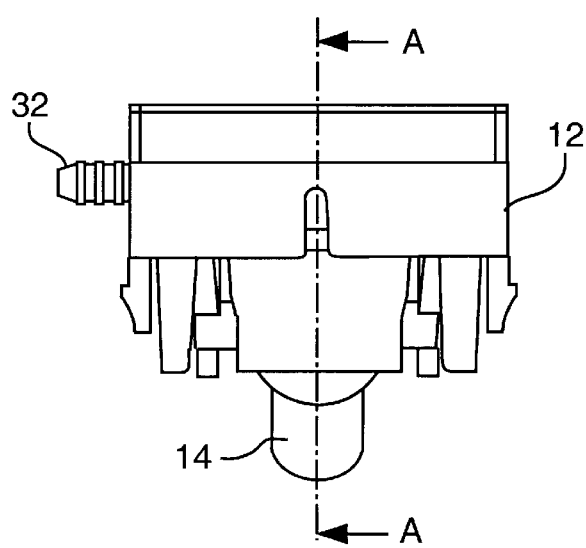
FIG. 4 the drain tub in rear view.

FIG. 4 finally shows the drain tub 12 from the rear.

We claim:

1. An espresso machine for use with filter capsules, the espresso machine comprising:
   a hydraulic assembly having a cylinder and a piston;
   a heater element for heating water;
   a scalding unit between the hydraulic assembly and the heater element, the scalding unit for receiving heated water from the heater element, the scalding unit including two scalding chamber parts movable relative to one another between an opening position and a closing position upon actuation of the hydraulic assembly, the scalding chamber parts in their opening position defining therebetween a gap having a top and a bottom, the scalding unit further including an upper lever having a first and a second position for closing and opening, respectively, the top of the gap and a lower lever having a first and a second position for closing and opening, respectively, the bottom of the gap; and
   an actuation assembly coupled to the scalding unit and including an actuation lever for moving both the upper lever from its first to its second position and the lower lever from its second to its first position.

2. An espresso machine according to claim 1, wherein the scalding unit further includes a spring coupled to the upper lever for restoring the upper lever to its first position.

3. An espresso machine according to claim 2, wherein the actuation assembly includes a first cam and the upper lever includes a second cam and the actuation lever is coupled to the upper lever by way of the first cam acting on the second cam, wherein the second cam can be disconnected from the first cam under a predetermined disconnecting force supplied to the upper level by the hydraulic assembly.

4. An espresso machine according to claim 3, wherein the predetermined disconnecting force is applied to the upper lever while the two scalding chamber parts move from their opening position to their closing position.

5. An espresso machine according to claim 1, wherein the actuation assembly includes a first cam and the upper lever includes a second cam and the actuation lever is coupled to the upper lever by way of the first cam acting on the second cam, wherein the second cam can be disconnected from the first cam under a predetermined disconnecting force.

6. An espresso machine according to one of the claims 1–4, wherein the actuation lever indirectly acts on the lower lever by way of the upper lever.

7. An espresso machine according to claim 1, wherein the upper lever and the lower lever are coupled to a movable unit and the hydraulic assembly is capable of moving the two scalding chamber parts relative to each other and of moving the movable unit and the upper and lower levers over a distance which is shorter that the distance between the opening and the closing positions of the two scalding chamber parts.

8. An espresso machine according to claim 1, wherein the actuation lever is coupled with a first rotary valve in a hydraulic line coupled to the hydraulic assembly for moving one of the two scalding chamber parts.

9. An espresso machine according to claim 8, wherein the actuation lever is coupled with a second rotary valve in a water supply line coupled to the heater element.

10. An espresso machine according to claim 1, wherein the actuation lever is coupled with a first tracer switch for electrically switching on a hydraulic pump, preferably with a first time delay.

11. An espresso machine according to claim 10, wherein the actuation lever is coupled with a second for switching on the heater element and a pressure pump for scalding water, preferably with a second time delay.

12. An espresso machine according to claim 1, including a drain pipe coupled to the piston, the angle of the drain pipe being adjustable relative to the piston.

13. An espresso machine according to claim 12, wherein a drain tub having a base is coupled to the piston and the drain pipe is swivel-mounted in the base of the drain tub.

14. An espresso machine according to claim 13, wherein a movable one of the two scalding chamber parts has a drain opening and the drain tub is arranged under the drain opening such that the drain opening is always situated over the drain tub.

15. An espresso machine according to one of the claims 1–4 or 5, wherein the lower lever includes a third cam and the actuation lever acts on the lower lever by way of the second cam acting on the third cam.

16. An espresso machine according to claim 17, wherein the lower lever during actuation of the actuation lever reaches its first position before the upper lever reaches its second position and the second cam disconnects itself spontaneously from the third cam when the lower lever reaches its first position.

17. An espresso machine according to claim 16, wherein the third cam includes a spring lug.

18. An espresso machine for use with filter capsules, the espresso machine comprising:

a hydraulic assembly having a cylinder and a piston;

a heater element for heating water;

a scalding unit between the hydraulic assembly and the heater element, the scalding unit for receiving heated water from the heater element, the scalding unit including two scalding chamber parts movable relative to one another between an opening position and a closing position upon actuation of the hydraulic assembly, the scalding chamber parts defining therebetween a gap having a top and a bottom, the scalding unit further including an upper lever having a first and a second position for closing and opening, respectively, the top of the gap and a lower lever having a first and a second position for closing and opening, respectively, the bottom of the gap; and an actuation assembly coupled to the scalding unit and including an actuation lever for actuating the hydraulic assembly and the heater element and for moving the upper lever from its first to its second position and the lower lever from its second to its first position, wherein the actuation lever includes a first cam and the upper lever includes a second cam and the actuation lever is coupled to the upper lever by way of the first cam acting on the second cam, wherein the second cam can be disconnected from the first cam under a predetermined disconnecting force supplied to the upper level by the hydraulic assembly.

19. An espresso machine according to claim 18, wherein the predetermined disconnecting force is applied to the upper lever while the two scalding chamber parts move from their opening position to their closing position.

20. An espresso machine according to one of the claims 18 or 19, wherein the lower lever includes a third cam and the actuation lever acts on the lower lever by way of the second cam acting on the third cam.

21. An espresso machine according to claim 20, wherein the lower lever during actuation of the actuation lever reaches its first position before the upper lever reaches its second position and the second cam disconnects itself spontaneously from the third cam when the lower lever reaches its first position.

22. An espresso machine according to claim 21, wherein the third cam includes a spring lug.

23. An espresso machine according to claim 18, wherein the actuation lever is coupled with a first rotary valve in a hydraulic line coupled to the hydraulic assembly for moving one of the two scalding chamber parts.

24. An espresso machine according to claim 23, wherein the actuation lever is coupled with a second rotary valve in a water supply line coupled to the heater element.

25. An espresso machine according to claim 18, wherein the actuation lever is coupled with a first tracer switch for electrically switching on a hydraulic pump, preferably with a first time delay.

26. An espresso machine according to claim 25, wherein the actuation lever is coupled with a second tracer switch for switching on the heater element and a pressure pump for scalding water, preferably with a second time delay.

27. An espresso machine according to claim 18, including a drain pipe coupled to the piston, the angle of the drain pipe being adjustable relative to the piston.

28. An espresso machine according to claim 27, wherein a drain tub having a base is coupled to the piston and the drain pipe is swivel-mounted in the base of the drain tub.

29. An espresso machine according to claim 28, wherein a movable one of the two scalding chamber parts has a drain opening and the drain tub is arranged under the drain opening such that the drain opening is always situated over the drain tub.

30. An espresso machine according to claim 18, wherein the actuation assembly includes a first cam and the upper lever includes a second cam and the actuation lever is coupled to the upper lever by way of the first cam acting on the second cam, wherein the second cam can be disconnected from the first cam under a predetermined disconnecting force.

* * * * *